March 11, 1930.    G. A. B. SPENCER ET AL    1,750,201
TWO-CYCLE ENGINE
Filed July 23, 1927    2 Sheets-Sheet 1
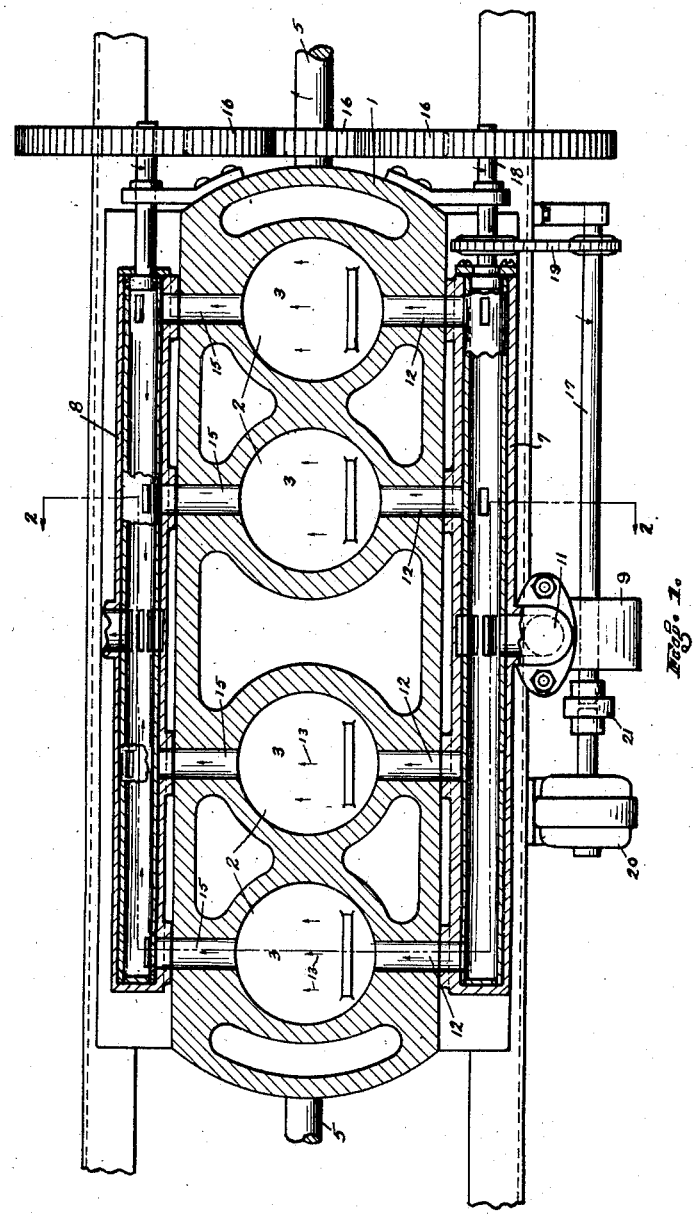
INVENTORS
GARDNER A. B. SPENCER,
HARRY B. CORNISH.
BY
Munn & Co.
ATTORNEYS March 11, 1930.  G. A. B. SPENCER ET AL  1,750,201
TWO-CYCLE ENGINE
Filed July 23, 1927  2 Sheets-Sheet 2
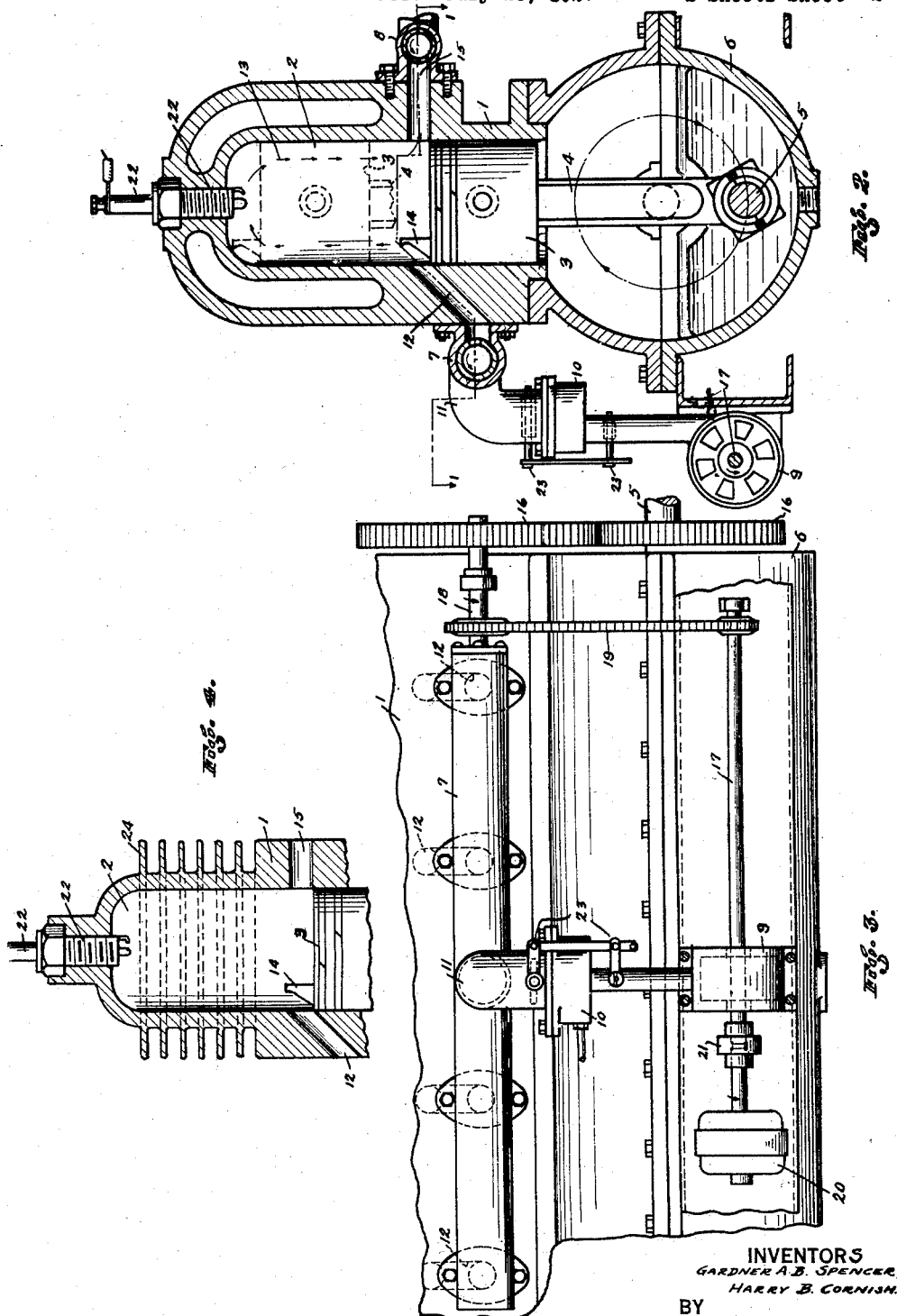
INVENTORS
GARDNER A. B. SPENCER,
HARRY B. CORNISH.
BY Munn & Co.
ATTORNEYS.

Patented Mar. 11, 1930

1,750,201

UNITED STATES PATENT OFFICE

GARDNER A. B. SPENCER AND HARRY B. CORNISH, OF ALAMEDA, CALIFORNIA

TWO-CYCLE ENGINE

Application filed July 23, 1927. Serial No. 207,959.

Our invention relates to improvements in two cycle engines, and it consists in the combinations, constructions, and arrangements hereinafter described and claimed.

An object of our invention is to provide a two cycle internal combustion engine which employs time controlled intake and exhaust valves for forcing gases of combustion into the cylinder at the proper times, and under the proper pressure, and for permitting these gases to exhaust at the proper times.

A further object of our invention is to provide a device of the type described which has novel means for directing the intake gases toward the top of the cylinders and for shutting off the exhaust port prior to the shutting off of the intake port, whereby the intake gases will aid in forcing the exhaust gases from the cylinder, yet at the same time the exhaust ports will close before the intake gases start to flow therethrough.

Other objects and advantages will appear in the following specification, and the novel features of our invention will be particularly pointed out in the appended claim.

Our invention is illustrated in the accompanying drawings, forming a part of this application, in which:

Figure 1 is a section along the line 1—1 of Figure 2;

Figure 2 is a section along the line 2—2 of Figure 1;

Figure 3 is a side elevation of a portion of the engine; and

Figure 4 is a modified form of the device illustrating the cylinders as being air cooled.

In carrying out our invention we provide an engine block 1, having a plurality of cylinders 2 therein. These cylinders may be of any number, and the drawings show a four-cylinder engine.

In each of these cylinders we mount a piston 3, which is connected by a piston rod 4, to a crank shaft 5. A crank case 6 is secured to the engine block 1 in the usual manner.

In place of feeding the intake gases from the crank case to the cylinders, we provide time controlled valves 7 and 8 for controlling the intake and exhaust ports, and we further provide a fan 9 for forcing air under pressure into the cylinders at the proper time.

Figures 1 and 2 show how the fan 9 is adapted to suck in air and to force this air through a carburetor 10, and then through a pipe 11 to the intake valve 7.

The valve 7 in the present instance is of the rotary sleeve type, although it may be of any other standard type of construction desired. The principal feature of the invention is to provide a time controlled valve for a two cycle engine which will force gases of combustion into a cylinder at the proper time. The fan 9 and the valve 7 accomplish this result. Figure 2 shows how passageways 12 leading from the valve 7 to each cylinder 2 are inclined for forcing the intake gases in the direction of the arrows 13. A lug 14 is carried by the top of each piston 3 and is used for directing the intake gases upwardly.

The valve 8 is also of the rotary sleeve type and controls the exhaust ports 15.

From the foregoing description of the various parts of the device, the operation thereof may be readily understood.

The valves 7 and 8 may be connected to the crank shaft in any well known manner, and we have shown gears 16, see Figure 1, for effecting this connection.

The fan 9 is normally operated by a shaft 17, when the engine is running this being connected to the drive shaft 18 of the valve 7, by means of a chain and sprocket connection 19. It is obvious that any other manner of connecting the two shafts together, or of directly connecting the shaft 17 with the crank shaft 5 may be done without departing from the spirit and scope of our invention.

When initially starting the engine a motor 20 is employed for actuating the fan 9. This motor is connected to the fan by means of a ball-bearing clutch 21, of well known construction, so that the motor will be automatically disconnected from the fan when the shaft 17 takes up the burden of actuating the fan. The engine works on a two cycle principle, that is, each cylinder exhausts and receives new gases of combustion when the piston 3 uncovers the ports 12 and 15 and a spark from the spark plug 22 ignites the gases of combustion when the piston is in the dotted line position shown in Figure 2.

The usual practice of the two cycle engine is to have the piston 3 act as a valve for the intake and exhaust ports 12 and 15. We have found this to be wrong in principle, because the length of time necessary in scavenging a cylinder and in introducing new gases into the cylinder vary with different speeds of the engine, and also the pressure of the intake gases vary with the speed of the engine. The standard two cycle engine depends on crank case compression for delivering gases to the intake port. The valves 7 and 8 are so timed with respect to the crank shaft 5 as to cause both of these valves to open into a cylinder when the piston 3 is in the full line position shown in Figure 2, but to have the exhaust valve close just prior to the closing of the intake valve. In this way the two valves remain open long enough to thoroughly scavenge the cylinder, and the intake valve remains open a long enough period after the closing of the exhaust valve to place the gases within the cylinder under a sufficient pressure. This pressure, it will be noted, will remain constant regardless of the load placed upon the engine; therefore, the engine will function uniformly for different loads. The fan or blower is to be driven at such a speed as to produce air of sufficient volume and velocity to fill the cylinders under all conditions. The fan may be directly driven by the engine or may be driven by an auxiliary source of power.

It is obvious that the exhaust valve may be dispensed with, if desired, and only intake valves be used in combination with the two cycle engine. The intake valve is the vital part of the device and this, together with the forced feed, causes the engine to function properly. The intake valve is to be located with respect to the cylinder in the place best suited for the valve. For example, the valve may be located directly on top of the cylinder head, if desired.

The intake and exhaust valves work in conjunction with the piston and it will therefore be seen that the ports 12 and 15 are controlled by the valves and by the piston. In Figure 3 I show controlled valves 23 for regulating the flow of air into the carburetor 10, and the flow of the gases of combustion into the intake valve 7.

The engine is designed to be air cooled or water cooled. Figure 4 shows fins 24 as projecting from the cylinder 2, while Figures 1 to 3, inclusive, show a water cooled motor. Either form may be used without departing from the spirit and scope of our invention.

Although we have shown and described different embodiments of our invention, it is to be understood that the same is susceptible of various changes and we reserve the right to employ such changes as may come within the scope of the appended claim.

We claim:

An internal two-cycle combustion engine having a cylinder with a closed top, a piston mounted in said cylinder, said cylinder having an intake and an exhaust port disposed in a position to be uncovered by said piston only when said piston reaches its lowermost position, means for delivering a combustible mixture under pressure to said intake, and a single valve for the intake and a single valve for the outlet port for controlling the flow of gases therethrough.

GARDNER A. B. SPENCER.
HARRY B. CORNISH.